United States Patent [19]

Mirdadian

[11] 3,873,814
[45] Mar. 25, 1975

[54] REMOTELY OPERATED NET OUTPUT TICKET PRINTER

[76] Inventor: Mohammad Kian Mirdadian, 7020 Atwell, Houston, Tex. 77036

[22] Filed: Feb. 20, 1973

[21] Appl. No.: 334,080

[52] U.S. Cl......... 235/92 FL, 235/92 EA, 235/92 R, 73/194 E
[51] Int. Cl...................... G06m 1/276, G06m 3/06
[58] Field of Search ..... 235/92 FL, 92 DM, 92 MT, 235/92 EA, 92 EL, 92 V, 92 H, 92 NT; 73/194 E

[56] References Cited
UNITED STATES PATENTS
3,169,185   2/1965   Nines............................. 235/92 FL
3,723,711   3/1973   Kamata......................... 235/92 EA
3,729,996   5/1973   Metz................................. 73/194 E

*Primary Examiner*—Gareth D. Shaw
*Assistant Examiner*—Joseph M. Thesz, Jr.
*Attorney, Agent, or Firm*—Torres & Berryhill

[57] ABSTRACT

The pulsating output signal from a metering device is conveyed to a K factor selection circuit which counts the number of pulses present in the meter signal and, when a predetermined, selectable number of pulses has been counted, produces a unit output pulse representing a unit volume of flow past the metered point. The unit output pulse is supplied to a second circuit which regulates the supply of pulsating DC power to an incremental motor which in turn mechanically turns the rotatable drive shaft of a register and ticket printer. A revolution sensor interrupts the pulsating power supply to the motor when the shaft completes a single revolution. The occurrence of another unit input pulse reactivates the motor and the described cycle is repeated. Each revolution of the drive shaft advances the register display by one unit and means are provided whereby the accumulated count in the register may be imprinted on a ticket.

23 Claims, 4 Drawing Figures

REMOTELY OPERATED NET OUTPUT TICKET PRINTER

BACKGROUND OF THE INVENTION

1. Field of the Invention

THe present invention relates to the measurement of a variable parameter such as volumetric flow, fluid flow rate, temperature and other variable quantities. In the specific applicaton to be descrbed, the present invention relates to means for determining the net volume of fluids flowing past a metered point, the formation of a visible output directly indicating the net volumen of such flow and the remote printing of a ticket with the value for the net volume.

2. Brief Description of the Prior Art

One of the common tecniques employed to meter fluids such as crude oil flowing through a pipe line is to insert rotors into the pipe line so that a given amount of rotor rotation is required, to permit a given amount of such fluid to move past the meter. Meters operating on this principle are referred to generally as positive displacement meters. In such metering schemes, the rotor or other mechanical device being moved by the flowing fluid is mechanically linked to a system externally of the flow line whereby the movement in the mechanical linkage is employed to measure the amount of fluid flowing through the meter and, in many cases, to drive a register and a ticket printer. The register conventionally shows an accumulated volume of flow and the ticket printer, when activated, imprints the indicated volume on a removable ticket.

Another prior art measuring system usually employed to meter uniform, clean fluids, provides a turbine blade in the flow line so that the flow of the fluid causes the turbine blade to rotate. A permanent magnet carried on one of the turbine blades induces an electric signal in a coil when magnet is moved past the coil. The induced signal is then measured to determine the volume of flow through the meter. This latter system is not generally employed with coarse, heavy fluids which may contain solid materials and other impurities because such fluids may adhere to the turbine blades and otherewise adversely act on the meter to create false readings.

While the turbine type system is desirable in many applications because of its simplicity and the absence of any mechanical linkage between the internal turbine blade an the external meter system, it is unsatisfactory for use with many fluids and in some applications where ambient electrical noise will override the relatively small electrical signal produced by the metering system. In this latter regard, the electrical output produced by the turbine type metering system varies in amplitude as a function of the rate of rotation of te turbine. The lower rates of revolution produce smaller amplitude signals which can be lost in systems where the ambient noise level is high or where construction work, such as electrical welding, is being conducted on or in the vicinity of the system being metered.

The positive displacement type measuring systems are undesirable, as compared with the turbine systems, to the extent that they require more equipment, retard the flow of the metered fluid and are subject to friction and wear which undesirably alter the meter output over a period of time. Positive displacement type system, however, are advantageous when compared with turbine type systems in that they can handle heavy, coarse and impure fluids and because the mechanical power provided by the meter movement can be employed to drive a register and a ticket printer mechanically connected tq the meter.

In many metering applications, it is desirable to provide the meter reading or output at a location remote from the metering point. In addition, it is often desirable to print a ticket or other recording means with the measured volume. The turbine type meter cannot produce power and therefore auxillary powering means must be employed to drive any register or ticket printer associated with the meter. The same need occurs with some positive displacement meters where the power developed by the meter is not sufficient to drive the register and ticket printer. In either case, where such remote registers and ticket printers are employed, means must be provided for regulating the operation of the register so that it displays the actual volume of fluids flowing past the metered point. Because of inertial effects involved in driving conventional registers and ticket printers, precise operation of the system can be substantial problem. If the rotatable drive shaft employed to operate many conventional registers and ticket printers is under or over rotated, ac cumulative error can be produced causing large discrepancies between the volume indicated by the register and the actual volume flowing through the meter.

While it could conceivably be possible to design a system which did not require the mechanical means found in conventional registers and ticket printers, thereby avoiding the inertial control problems, such systems would be relatively expensive and would require long term usage before being accepted by the industry. For these reasons, it has been difficult to obtain a remotely operated ticket printer which employs conventional printing and register equipment and which can be precisely controlled so that the register amount and the actual metered amount exactly correspond.

Another related problem associated with prior art metering systems stems from the fact that the meter output changes with time due to wear or because of a change in the metered fluid itself or due to other circumstances. Because of these changes, flow of a given volume of fluid past the metered point may produce a register indication different from that which should have been produced based on the manufacturer's specifications for the meter. To correct for this discrepancy between actual and indicated register volume, an operator conventionally multiplies the indicated register output by the "meter factor". The latter quantity is a correction factor obtained by dividing the manufacturer's specifications relating the number of pulses which should be produced by the meter for a unit volume of flow by the actual number of pulses produced by the meter for a unit volume of flow. These two numbers are respectively the published K factor and the measured K factor. The corrected valve obtained after multiplying the indicated volume by the meter factor is termed the "net volume".

It will be appreciated from the described procedure that in order to obtain the true or net volume of flow through the meter, it is necessary to know the manufacturer's specifications for the meter, it is necessary to know the actual volume flowing through the meter which produces the indicated output and it is necessary for an operator to perform the mathematical operations required to determine meter factor and net volume. The requirement for operator intervention to calculate the net volume delivered is expensive and more susceptible to error. It is, therefore, desirable to employ a system in which net volume is automatically calculated, registered and printed out.

SUMMARY OF THE INVENTION

Precise operation of a remotely located register and ticket printer is effected by employing a position sensitive switching means to interrupt the supply of power to an incremental electric motor when the drive shaft powering the register and printer is at a given angular position. In the preferred embodiment, power is supplied to the electric motor when the system is provided with a unit pulse produced by a K factor selection circuit. A revolution sensor interrupts the supply of power to the electric motor when the register and ticket printer drive shaft has completed a single revolution. The incremental motor inherently stops rotor movement almost immediately after the motor's power supply is removed. The disruption of power occurs when a complete revolution of the shaft is completed so that any shaft overrun due to inertial forces is noncumulative for any overrun less than a full revolution.

In the preferred embodiment, one unit pulse produces one revolution of the register and ticket printing drive shaft which in turn produces an advance of one unit in the register display and imprinter. Power is resupplied to the motor when a subsequent unit pulse is received and is again switched off from the motor when one revolution of the shaft is completed. The motor drive circuitry employed to power the incremental motor is supplied with a control pulse train an oscillator circuit. In operation, the control pulse train is employed to gate a power transistor whih supplies a chopped D.C. voltage to the incremental motor at the same frequency as that of the pulse train. Each pulse in the power supply advances the motor by one angular increment. The frequency for the control pulse train is selected to be high enough that a full revolution of the motor occurs before the next unit pulse can be produced. A drive logic and power control circuit supplies the chopped powering D.C. voltage to the incremental motor when the unit input pulse is received and terminates the supply of the chopped D.C. voltage when the revolution sensor detects a full revolution of the register and ticket printer drive shaft. Use of an incremental motor with its inherent braking action when power is removed and use of a revolution sensor to determine the occurrence of a full revolution in the drive shaft ensures that each unit input pulse produces one and only one revolution of the ticket printer shaft.

An important feature of the present invention is the provision in the K factor selection of means for changing the number of input pulses required to produce a unit output pulse. This is done by means which permit the input pulses to be divided by a selected number so that a unit output pulse is produced each time the selected number of pulses occurs. The number of input pulses required to produce a unit output pulse from the K factor selection circuit is determined by moving a known volume of fluid through the meter and counting the number of pulses produced by the meter. The latter value is set into the K factor selection circuit so that the indicated output on the register automatically shows the net volume or true volume of flow through the meter. It will be appreciated that the net volume is thus obtained automatically, without human intervention, without having to calculate the meter factor and without having to multiply the indicated output by the meter factor each time fluid is delivered from the metered supply. The same system may of course be employed for either remotely situated or on-site registers and meters.

From the foregoing, it will be appreciated that one of the important objects of the present invention is to provide means for remotely driving a conventional register and printer where such register and printer are controlled and powered to display and print a ticket with the actual or net volume of flow past the metered point.

Another object of the present invention is to provide a remotely operated register and printer mechanism which is free from cumulative errors caused by overrun of the mechanical powering means operating the register and printer.

Another important object of the present invention is to provide a means for producing a true indication of the actual volume of fluids flowing past the metered point without the need for mathematical correction by a human operator, and without having to calculate the meter factor.

It is also an object of the present invention to provide a K factor selection circuit with which the number of input pulses required to produce a single output pulse may be changed to match different meters and to compensate for changes in the characteristics of a given meter or changes in the metered fluids.

Other features, advantages and objects of the invention may be more fully appreciated from the following specification and the related drawings and claims.

DESCRIPTION OF THE ILLUSTRATED EMBODIMENT

Figures 1, 4:
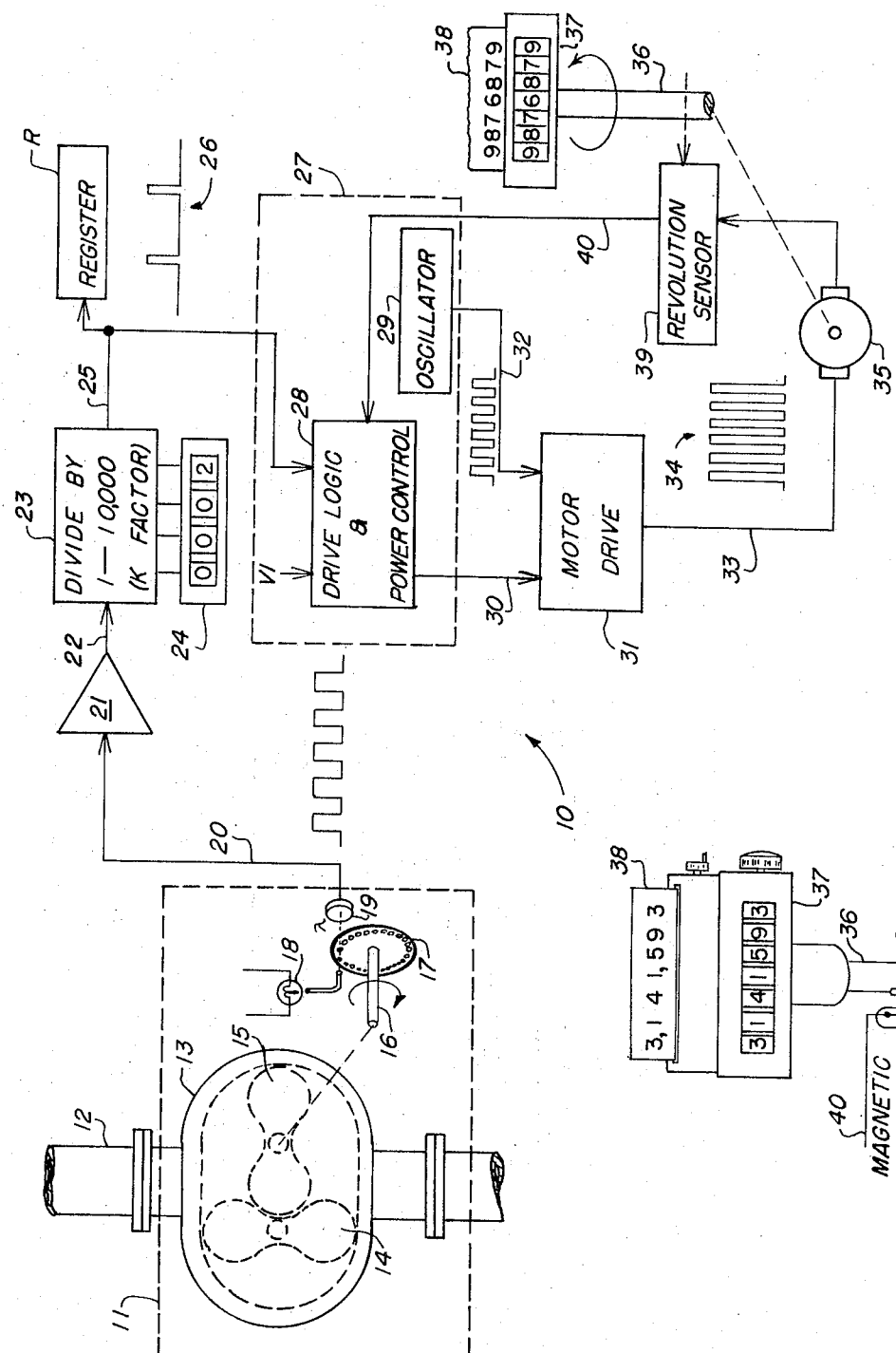
FIG. 1 is a schematic diagram illustrating the system of the present invention employed with a positive displacement meter.
FIG. 4 illustrates a magnetic reed switch employed in the present invention as a shaft revolution sensor.

The remotely operated net output ticket printer system of the present invention is indicated generally at 10 in FIG. 1 connected to the output from a conventional positive displacement type metering system 11. The system 11 includes a flow line 12 connected to a meter housing 13 which contains rotor elements 14 and 15. Flow of fluids through the flow line 12 causes the rotors 14 and 15 to counterrotate. The speed of the rotor rotation is varied as a function of the fluid flow rate which in turn is related to the volume of fluid flowing past the metered point. The rotor rotation is communicated through a suitable mechanical linkage to a meter output shaft 16 which in turn rotates an apertured light disc 17. As the disc 17 rotates, light from a source 18 travels through the plate apertures to a photoelectric cell 19. The photoelectric cell 19 converts the light energy to an electrical output signal in the form of a train of square wave pulses of equal amplitude and a frequency which varies as a function of the speed of rotor rotation. The system 11 is exemplary and any other metering system capable of producing a pulsating electrical output signal which is indicative of the volume of fluid flow past the metered point may be employed.

The output signal from the metering system 11 is supplied over a line 20 to a low level amplifier 21. The amplified signal is then provided on the amplifier output 22 and supplied as an input to a K factor selection circuit 23. A suitable division or K factor control 24 can be manipulated so that the input pulses are counted and a unit output pulse is formed on an output line 25 each time the number of pulses set in control 24 has been counted. For purposes of illustration, the K factor selection circuit 23 is illustrated with the division control means 24 set to divide the input pulses by 2 where it is assumed that two input pulses on the line 22 are equivalent to a unit volume of flow through the meter 13. It will be appreciated that division of the input pulses by a given number is equivalent to forming a unit output pulse each time the selected number of input pulses is counted by the circuitry 23.

The unit pulses indicated by the waveform 26 are provided as inputs to a register R and to a power and control circuit 27 which includes a drive logic and power control circuit 28 and an oscillator circuit 29. The register R is of the relay activated type which is not subject to inertial control limitations. a d.c. power input VI is also supplied to the circuit 28 where it is conducted through electronic switching means (not illustrated) to an output line 30 which conveys the power supply to a conventional motor drive circuit 31. The oscillator output signal is supplied over a line 32 to the motor drive circuit 31 which may be any suitable means which functions to chop the VI power supply into a square wave pulse train in which the power pulses occur at the frequency of the oscillator output signal. The power pulses indicated by the wave form 34 are supplied over a line 33 to an incremental or stepping motor 35 which is conventional and is of the type which rotates one angular increment for each power pulse supplied over the line 33. In the preferred embodiment of the present invention, the motor 35 includes 200 equal increments so that each pulse in the waveform 34 causes the motor to rotate 1.8°and a full revolution of the motor requires 200 pulses.

The rotor of the motor 35 is mechanically linked by any suitable means to a drive shaft 36 extending from a combined ticket printer and register mechanism 37. The register and printer mechanism is conventional and is designed to advance the register display and imprinter by one unit for each revolution of the shaft 36 and, when activated by any suitable means, to imprint the accumulated register count onto a ticket 38 which can be removed from the mechanism. The mechanism 37 may be a PD-GS (169500 series) ticket printer and counter produced by Veeder-Root or an A. O. Smith ticket printer model 2610 or equivalent. Meters of this type are well known and accepted in the industry but are difficult to operate at remote locations by conventional systems.

For the sake of simplicity, the system of the present invention has been described employing a standard register and imprinter mechanism which advances the register count one unit for each revolution of the drive shaft powering the device. It will be appreciated, however, that, if desired, one revolution of the drive shaft may be selected to produce more or less than a single unit advance of the register count and the other portions of the system may be changed accordingly. Similarly, if desired, suitable means may be provided so that two or more unit pulses must be formed before the register count advances by one unit.

The angular position of the drive shaft 36 is determined by a revolution sensor 39 which, in the preferred form of the invention, produces a signal on an output line 40 to indicate the occurrence of a full revolution of the shaft. The signal appearing on the line 40 is fed back to the circuit 28 to control operation of the electronic switching means regulating the supply of power on the output line 30.

In operation, the system 10 illustrated in FIG. 1 produces meter pulses as fluid flows through the line 12. The number of meter pulses produced bears a specific relationship to the amount of fluid flowing through the flow line and this relationship is initially determined accurately by any appropriate, conventional testing means. The relationship is employed to establish the K factor or number by which the pulse total from the meter output should be divided in order to reflect in the mechanism 37 that a single unit of volume has moved through the metered flow line. With this relationship determined and the appropriate number set into the control 24, the circuit 23 automatically forms a single unit pulse each time the established number of input pulses occurs on the line 22. The unit pulses advance the count on the register R by one unit. The unit pulses also activate the circuit 28 which in turn causes the VI power supply to be provided on the line 30 at the onset of the unit pulse and to remain on the line 30 until the signal on the line 40 indicates the completion of a full revolution of the drive shaft 36. When the signal on line 40 occurs, the voltage level on the line 30 drops to zero and power to the motor 35 is stopped. The motor rotor stops almost immediately when the power supply is interrupted so that very little overrun of the shaft 36 occurs. In any event, even if the shaft 36 continues to rotate slightly after the power is interrupted the register indication is not changed if the over-rotation is less than a full revolution so that the correct accumulated volume is displayed in the register. The next unit pulse causes power to be resupplied to the motor and the revolution sensor again interrupts the supply when a full revolution, including any over-rotation, is completed. By this means, the register 37 produces a unit increase for each unit pulse and any errors in over rotating the drive shaft are noncumulative.

Figure 2:
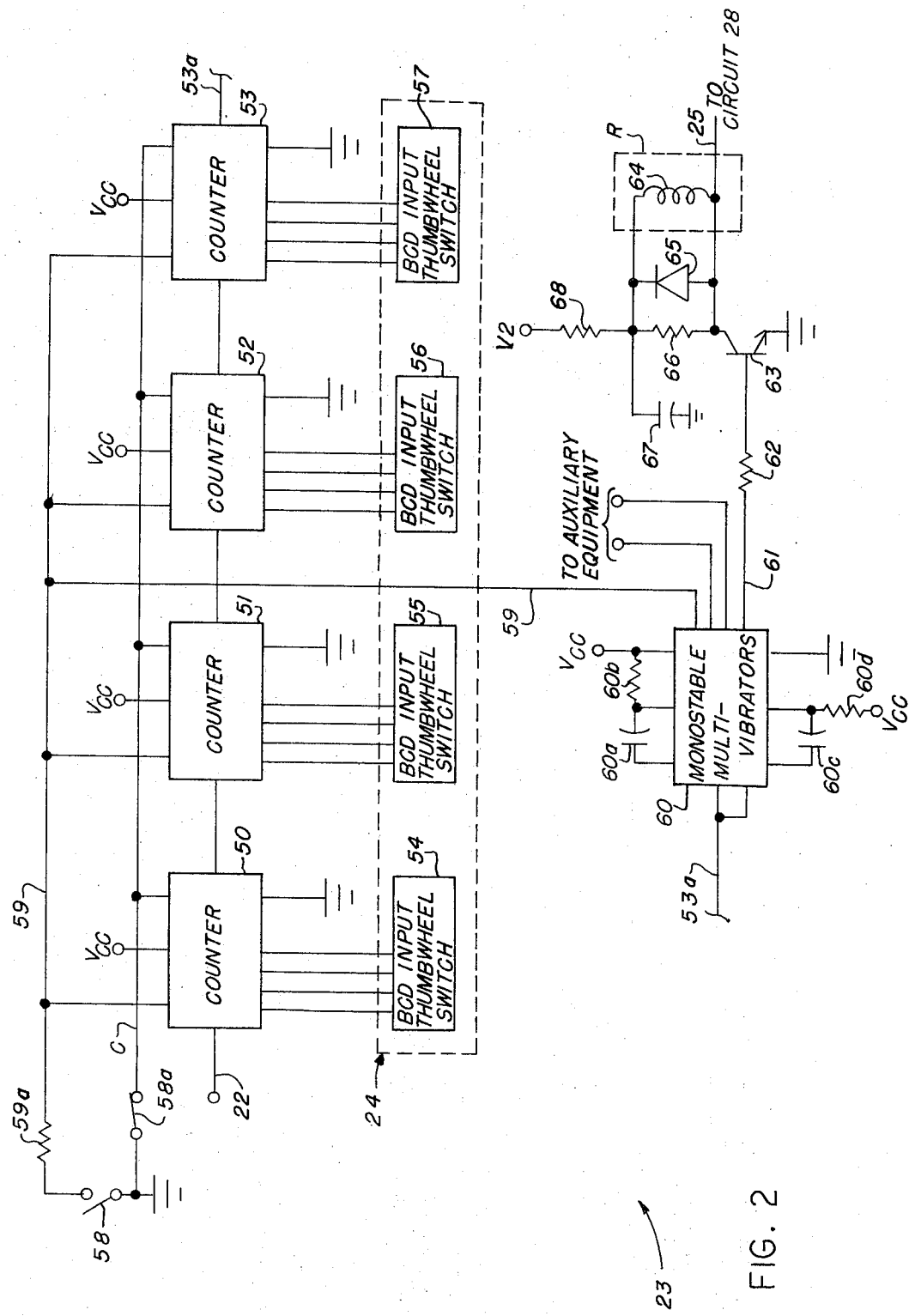
FIG. 2 is a schematic diagram illustrating the K factor selection circuit of the present invention.

FIG. 2 illustrates an exemplary circuit capable of use as the K factor selection circuit 23. The circuit 23 includes four synchronous 4-bit up/down counters 50, 51, 52 and 53 cascaded to form a counter capable of performing division by any number from 1 to 10,000. Additional stages may be added to enable division by larger number. Each of the counters 50-53 may be in the form of integrated circuits (ICs) provided with four data inputs from the control 24 which may be employed to preset the count in each of the ICs to any number between and including 0-9. To this end, a thumbwheel arrangement or other suitable operator controllable means 54-57 may be employed for the control 24 to select the desired preset count for each of the stages of the counter. Circuits 50-53 are connected in a conventional manner to function as a "down counter" and the illustrated inputs to each of the IC's are in the binary coded decimal form which employs four data inputs. In effect, the down-counter counts down one unit from the number loaded into the counter for each input pulse appearing on the line 22. Texas Instruments integrated circuit SN74192 or other suitable circuitry capable of dividing an incoming count by a selected integral number may be employed for the IC's 50–53.

The "clear" input to the integrated circuits is grounded by a line C through the normally closed contacts of a manually operated switch 58a to prevent noise pickup. A normally open load switch 58 may be employed to apply a grounding pulse to a line 59 through a current limiting resistor 59a to manually load the integrated circuits 50–53 with the values or numbers present in the inputs 54–57 of control 24 for the first cycle of the counter. This is done after the clear switch 58a is opened to clear the counters. When each of the integrated circuits 50–53 counts down to zero, an output pulse is formed on an output line 53a and supplied to an integrated circuit 60. The circuit 60 is connected as a monostable multivibrator or "single-shot". In the preferred form, the circuit 60 includes two single-shots, each of which has an input supplied from the circuit 53. An integrated circuit suitable for use as the dual single-shot circuit 60 is the Texas Instruments SN74123 dual retriggerable monostable multivibrator.

When a pulse is formed on the line 53a, the IC 60 forms a reload pulse on the line 59 to reload the data values preset in 54–57 into the circuits 50–53. The reload pulse formed on the line 59 is shaped by a timing circuit formed by a capacitor 60a and a resistor 60b. In an exemplary embodiment, the capacitor 60a has a value of 0.05 microfarads and the resistor 60b has a value of 2.2 K ohms producing a reload pulse of a few microseconds width each time the number of pulses specified in the reset input control 24 appears on the input line 22. A second timing circuit formed by a capacitor 60c and a resistor 60d regulates the duration of a control pulse formed on a line 61. The reload pulse and the control pulse are simultaneously formed when the inputs to the circuit 60 are appropriately signaled. In an exemplary embodiment, the capacitor 60c has a value of 4.7 microfarads and the resistor 60d has a value of 2.2 K ohms to provide a control pulse on the line 61 of approximately 50 milliseconds duration. The relay pulse on the line 59 is preferably of relatively short duration so that the down-counter circuitry can be reloaded after the last meter pulse in a given count occurs on the line 22 and before the next meter pulse for the new count is present on line 22. Other outputs from the circuit 60 may be employed to drive auxillary display and registry equipment (not illustrated)

The control signal formed on the output line 61 is communicated through a resistor 62 to the base of a power transistor 63. The presence of the control signal on the line 61 biases the transistor into conduction to ground the circuit connected to the collector of the transistor. The latter circuit includes the inductive load 64 of the register R, a diode 65 and a resistor 66 connected in parallel with the load 64. Power for the register R is supplied from a DC voltage supply V2 of approximately 15 volts through an RC circuit formed by a capacitor 67 and resistor 68. In operation, the capacitor 67 charges to the positive voltage V2 when the transistor 63 is in its nonconducting state. When a control signal appears at the base of the transistor, current flows through the load of the register R to advance the register count by one unit. When the control pulse at the base of the transistor is terminated, the transistor stops conducting and the back EMF generated by the collapsing field in the inductive load of the register R is transmitted through the diode 65 and resistor 66 and through the power supply V2 to ground. By this means, voltage transients are prevented from damaging the power transistor 63.

Figure 3:
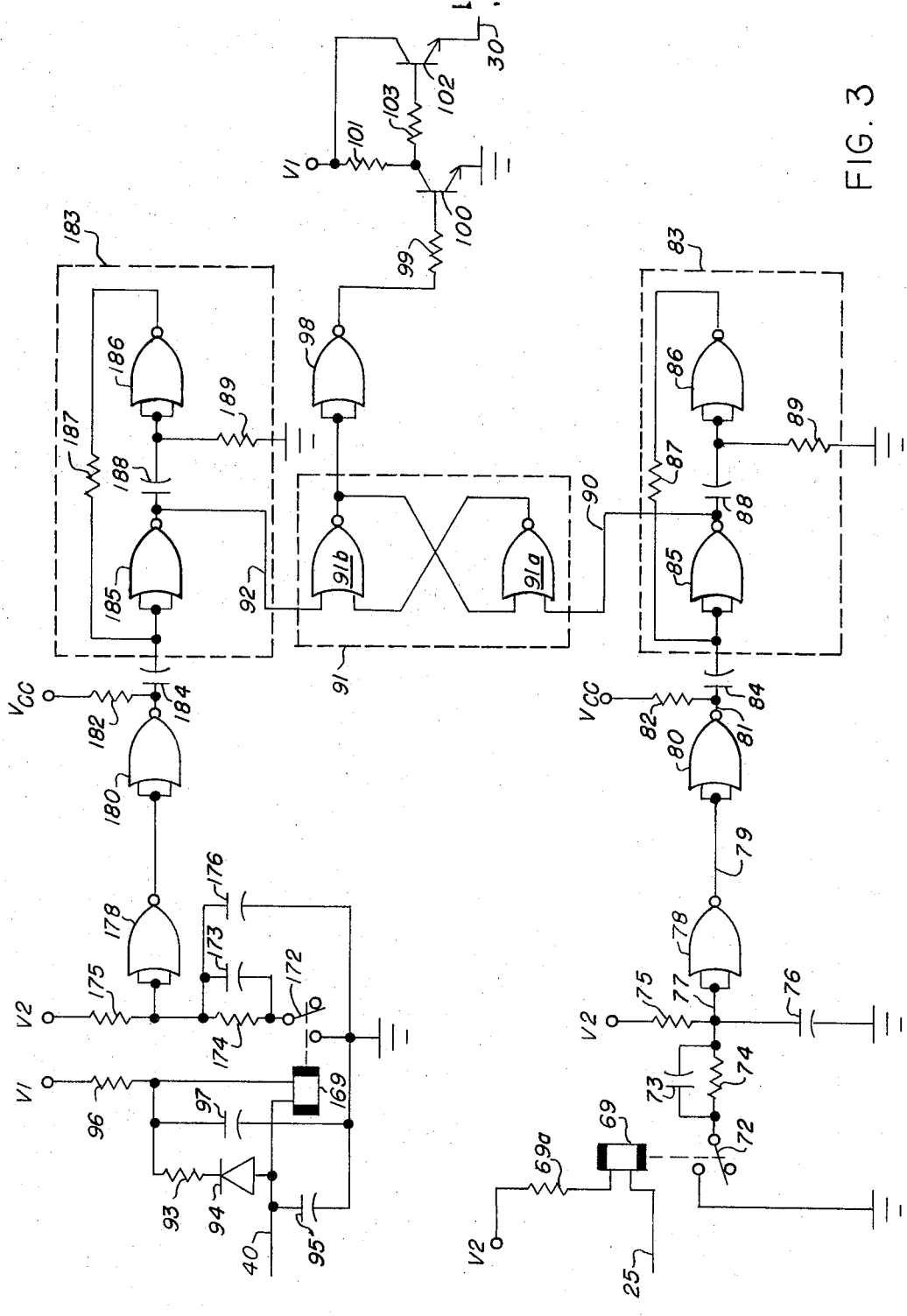
FIG. 3 is a schematic diagram illustrating the ticket printer logic drive and power control circuitry of the invention.

Current flow through the transistor 63 also energizes a relay coil 69 included as part of the drive logic and power control circuit 28. Referring to FIG. 3, the coil 69 is connected in series with a resistor 69a between a power supply V2 of approximately 15 volts and the line 25 from the circuit 23. When the coil is energized, relay contacts 72 are pulled closed to complete a path to ground for a pulse control circuit formed by a capacitor 73, resistors 74 and 75, and a capacitor 76. The D.C. voltage V2 is supplied to the pulse control circuit through a resistor 75 and a changing capacitor 76.

The line 25 may be relatively long and exposed to all types of electrical noise and for this reason, the relay 69 is employed to isolate the noise in line 25 so that a noise free unit pulse is supplied to the circuit 28 each time the transistor 63 in circuit 23 conducts. Closing of the relay contacts shorts the charge on capacitor 76 to ground through the parallel circuit formed by capacitor 73 and resistor 74. As this occurs, the voltage level on an input line 77 also drops toward ground potential. Line 77 supplies both inputs to a NOR gate 78 which produces a high level output on line 79 when both of its inputs drop toward ground. Capacitors 73 and 76 begin to charge toward a high value very quickly after the relay contacts 72 are closed which changes the inputs to the gate 78 and produces a low level output. By this means, a sharp, short duration pulse is produced on the line 79 with each closure of the relay contacts. It will be appreciated that the pulse duration is governed by the values of the capacitors 73 and 76 and the resistor 74 rather than the speed of movement of the relay contacts.

The pulse appearing on the line 79 is appplied to both inputs of a second NOR gate 80 which produces a low level signal at 81. A supply voltage Vcc of approximately 5 volts is connected through a resistor 82 to the output line 81 and the low pulse on line 81 is passed by the blocking capacitor 84 to the input of a monostable multivibrator 83. From the foregoing it will be appreciated that the gates 78 and 80 function to produce a well defined waveform for the pulse supplied to the circuit 83.

The multivibrator 83 is formed by two NOR gates 85 and 86, a feedback timing resistor 87 and an RC timing circuit formed by a capacitor 88 and a resistor 89. The output signal from the monostable multivibrator 83 is supplied on output line 90 in the form of square waves having pulses of equal widths and amplitudes. These signals are supplied as one input to a bistable multivibrator, or flip-flop 91. The second input to the flip-flop is supplied over a line 92 from a second wave shaping circuit similar in all respects to the one forming the signal on the line 90. That portion of the circuit 28 supplying the line 92 has been designated with reference characters which are 100 higher than those employed for similar components in that portion of the circuit supplying the pulses over the line 90.

The relay 169 is equipped with a protective circuit provided by a resistor 93 and diode 94. An input capacitor 95 functions as a filter to eliminate high frequency noise spikes on the line 40 from the revolution sensor 39. Power is supplied to the circuit from a source Vl through a resistor 96 and charging capacitor 97. When the coil 169 is deenergized, the resulting back EMF produces a current which flows through the diode 94 and resistor 93 to the power supply Vl.

The circuit 91 is formed by two latch connected NOR gates 91a and 91b and the circuit output is supplied to an inverting NOR gate 98. The output signal from the gate 98 is supplied through a resistor 99 to the base of a transistor 100. Power from a source Vl is supplied through collector resistor 101 to the transistor 100. When the transistor 100 is in its off state, a second transistor 102 is supplied through a resistor 103 with a biasing voltage which causes the transistor to conduct. DC power for the motor drive circuit 31 is supplied over the line 30 when the transistor 102 conducts. The occurrence of a high level output from the gate 98 thus terminates the supply of power over the line 30 by biasing the transistor 100 into conduction which in turn causes the transistor 102 to stop conducting.

From the foregoing, it will be understood that when the output level of the circuit 91 is low, occurrence of a unit pulse on the line 25 changes the state of the flip-flop 91 to produce a high output which permits the transistor 102 to conduct and supply power to the circuit 31. Thereafter, when a ground level pulse is supplied to the circuit 28 over the line 40, the state of the flip-flop 91 is changed to produce a low level output which causes the transistor 102 to stop conducting thereby terminating the supply of power to the circuit 31. The NOR logic circuits illustrated in FIG. 3 may be RCA CD4001AE COS/MOS NOR gates or other means capable of performing the described circuit functions.

Referring to FIG. 4, an exemplary method for determining the angular position of the drive shaft 36 of a conventional ticket printer and register 37 is illustrated. To this end, a magnetic element 36a is secured by any suitable means to the shaft 36 and a reed switch 39a is mounted at a fixed location in proximity to the shaft 36. Each time the shaft 36 completes a full revolution, the reed switch 39a is pulled to closed position by the magnetic influence of the element 36a. This in turn connects the line 40 to ground through the closed switch contacts to provide a grounding signal into the logic and control circuit 28. As the shaft 36 continues to rotate, the contacts of the switch 39a automatically resume their normally open position as the magnetic influence of the element 36a is removed from the switch. Thus, each time the shaft 36 makes a single revolution, the switch 40 will close momentarily and re-open when the magnetic element rotates away from the position of the reed switch. While a reed switch and magnetic element have been illustrated for generating a signal indicating the occurrence of a complete revolution of the shaft 36, it will be appreciated that other means including photoelectric and mechanical means as well as other suitable means may be employed for this purpose.

The foregoing disclosure and description of the invention is illustrative and explanatory thereof, and various changes in the size, shape and materials as well as in the details of the illustrated construction may be made within the scope of the appended claims without departing from the spirit of the invention.

I claim:

1. A metering system for forming a net output comprising:
   a. meter means for producing a meter signal functionally related to the value of a monitored, variable value parameter;
   b. measuring means connected with said meter signal for forming a net output signal each time said meter signal provides a predetermined input to said measuring means;
   c. selector means included with said measuring means for selecting the value of said meter signal required to form a net output signal, said selector means including a factor control setting means which may be set at a value equal to the meter signal value desired for forming a net output signal;
   d. register means supplied with said net output signal for accumulating a count of said net output signals,
   e. ticket printing means included with said register means for selectively printing the accumulated register count of net output signals in said register means onto a recording medium;
   f. power means connected with said register means for supplying power for mechanically advancing the count of said register means and for imprinting the register count onto said recording medium;
   g. feedback control means connected with said power means for causing said power means to advance said register count when said net output signals are supplied to said control means and for causing said power means to stop advancing said register count when the accumulated count in said register has advanced by a preselected amount;
   h. an incremental electrical motor included in said power means, said electrical motor having a rotor adapted to rotate one angular increment for each pulse of a pulsating electrical power supply applied to said motor;
   i. a rotatable drive shaft included in said register means for mechanically driving said printing means and for advancing said register count by an amount related to the angular position of said drive shaft, said motor being mechanically connected with the rotor of said drive shaft to rotate said shaft when said rotor is rotated;
   j. sensing means included in said control means for forming a sensing feedback signal indicating the angular position of said drive shaft; and
   k. switching means further included in said control means for applying said pulsating power supply to said motor in response to the formation of net output signals by said measuring means and for removing said pulsating power supply from said motor when said sensing feedback signal indicates that said drive shaft is at a predetermined angular position.

2. A system as defined in claim 1 wherein:
   a. said selector means includes a synchronous down-counter circuit;
   b. said factor control setting means includes means for loading said down-counter with a selected count; and
   c. the output of said down-counter is connected with an output circuit for forming a relatively narrow reload pulse for reloading said down-counter with said selected count after a full count of said meter pulses occurs and before the next meter pulse following a full count is supplied to said down counter.

3. A system as defined in claim 2 wherein:
   a. said register includes means for advancing said register count by one unit for each revolution of said drive shaft; and
   b. said control means includes means for applying said pulsating power supply to said rotor in response to the formation of one net output signal by said measuring means and for removing said pulsating power supply when said sensing means indicates that said drive shaft has completed a single revolution.

4. A system as defined in claim 3 wherein:
   a. said control means includes logic circuitry for forming a first output signal when supplied with a net output signal and a second different output signal when supplied with a sensing feedback signal;
   b. said first signal functions to apply said pulsating power to said motor; and
   c. said second signal functions to terminate the supply of said pulsating power to said motor.

5. A system as defined in claim 4 wherein said net output signals are supplied to said control means through a first relay switching circuit for isolating electrical noise from said control means.

6. A system as defined in claim 5 wherein said sensing feedback signal is supplied to said control means through a second relay switching circuit for isolating electrical noise from said control means.

7. A system as defined in claim 6 wherein both said first and second relay switching circuits include means for generating a short duration electrical pulse each time the switch contacts of said first and second relay circuits are moved to a predetermined position.

8. A system as defined in claim 1 wherein said sensing means includes a magnetic reed switch and a magnetic element associated with said drive shaft whereby the position of the switching contacts of said reed switch are changed by rotation of said shaft.

9. A system as defined in claim 8 wherein said magnetic element is carried by said rotating shaft and said reed switch is fixed relative to the rotary movement of said shaft.

10. A system as defined in claim 1 wherein:
    a. said register means includes means for advancing said register count by one unit for each revolution of said drive shaft; and
    b. said control means includes means for applying said pulsating power supply to said rotor in response to the formation of one net output signal by said measuring means and for removing said pulsating power supply when said sensing means indicates that said drive shaft has completed a single revolution.

11. A system as defined in claim 1 wherein said net output signals are supplied to said control means through a second relay switching circuit for isolating electrical noise from said control means.

12. A system as defined in claim 11 wherein said sensing feedback signal is supplied to said control means through a relay switching circuit for isolating electrical noise from said control means.

13. A system as defined in claim 12 wherein both said first and second relay switching circuits include means for generating a short duration electrical pulse each time the switch contacts of said first and second relay circuits are moved to a predetermined position.

14. A system as defined in claim 13 wherein:
    a. said selector means includes a synchronous down-counter circuit;
    b. said factor control means includes means for loading said down-counter with a selected count; and
    c. the output of said down-counter is connected with an output circuit for forming a relatively narrow reload pulse for reloading said down-counter with said selected count after a full count of said meter pulses occurs and before the next meter pulse following a full count is supplied to said down-counter.

15. A system as defined in claim 1 wherein:
    a. said control means includes logic circuitry for forming a first output signal when supplied with a net output signal and a second different output signal when supplied with a sensing feedback signal;
    b. said first signal functions to apply said pulsating power to said motor; and
    c. said second signal functions to terminate the supply of said pulsating power to said motor.

16. A measuring and printing system comprising:
    a. a conventional register and printing mechanism of the type having a rotatable drive shaft which, when rotated, advances a register count and simultaneously advances a printing means by an amount related to the angular position of said drive shaft whereby the printing means is selectively capable of imprinting the register count on a recording medium;
    b. meter means located remotely from said register and printer mechanism for producing a meter signal functionally related to the value of a monitored, variable value parameter;
    c. measuring means located remotely from said register and printer mechanism and connected with said meter signal for forming a unit output signal each time said meter signal provides a predetermined input to said measuring means;
    d. register means, included as a part of said conventional register and printing mechanism, supplied with said unit signal for forming a register count representative of the integral of the values of said parameter;
    e. ticket printing means included as a part of said conventional register and printing mechanism for selectively imprinting the accumulated register count of unit output signals in said register means onto a recording medium;
    f. power means connected with said conventional register and printing mechanism for supplying power for mechanically advancing the count of said register means and for imprinting the count onto said recording medium; and
    g. feedback control means connected with said power means for causing said power means to advance said register count when said unit output signals are supplied to said control means and for causing said power means to stop advancing said register count when the accumulated count in said register means has advanced by a preselected amount.

17. A system for remotely operating a conventional register and printing mechanism of the type having a rotatable drive shaft which, when rotated, advances a register count and simultaneously advances a printing means by an amount related to the angular position of said drive shaft whereby the printing means is selectively capable of imprinting the register count on a recording medium comprising:
a. meter means for producing a meter signal functionally related to the value of a monitored, variable value parameter;
b. measuring means connected with said meter signal for forming a unit output signal each time said meter signal provides a predetermined input to said measuring means;
c. register means, included as a part of said conventional register and printing mechanism, supplied with said unit signal for forming a register count representative of the integral of the values of said parameter;
d. ticket printing means included as a part of said conventional register and printing mechanism for selectively imprinting the accumulated register count of unit output signals in said register means onto a recording medium;
e. power means connected with said conventional register and printing mechanism for supplying power for mechanically advancing the count of said register means and for imprinting the count onto said recording medium;
f. feedback control means connected with said power means for causing said power means to advance said register count when said unit output signals are supplied to said control means and for causing said power means to stop advancing said register count when the accumulated count in said register means has advanced by a preselected amount;
g. an incremental electrical motor included in said power means, said electrical motor having a rotor adapted to rotate one angular increment for each pulse of a pulsating electrical power supply applied to said motor, said motor being mechanically connected with the rotor of said drive shaft to rotate said shaft when said rotor is rotated;
h. sensing means included in said control means for forming a sensing feedback signal indicating the angular position of the drive shaft; and
i. switching means included in said control means for applying said pulsating power supply to said motor in response to the formation of unit output signals by said measuring means and for removing said pulsating power supply from said motor when said sensing feedback signal indicates that said drive shaft is at a predetermined angular position.

18. A system as defined in claim 17 wherein:
a. said conventional register and printing mechanism includes means for advancing said register count by one unit for each revolution of said drive shaft; and
b. said control means includes means for applying said pulsating power supply to said rotor in response to the formation of one unit output signal by said measuring means and for removing said pulsating power supply when said sensing means indicates that said drive shaft has completed a single revolution.

19. A system as defined in claim 18 wherein said unit output signals are supplied to said control means through a first relay switching circuit for isolating electrical noise from said control means.

20. A system as defined in claim 19 wherein said sensing feedback signal is supplied to said control means through a second relay switching circuit for isolating electrical noise from said control means.

21. A system as defined in claim 20 wherein both said first and second relay switching circuits include means for generating a short duration electrical pulse each time the switch contacts of said first and second relay circuits are moved to a predetermined position.

22. A system as defined in claim 17 wherein:
a. said control means includes logic circuitry for forming a first output signal when supplied with a unit output signal and a second different output signal when supplied with a sensing feedback signal;
b. said first signal functions to apply said pulsating power to said motor; and
c. said second signal functions to terminate the supply of said pulsating power to said motor.

23. A system as defined in claim 17 wherein said sensing means includes a magnetic reed switch and a magnetic element associated with said drive shaft whereby the position of the switching contacts of said reed switch are changed by rotation of said shaft.

* * * * *

UNITED STATES PATENT OFFICE
CERTIFICATE OF CORRECTION

Patent No. 3,873,814                    Dated   March 25, 1975

Inventor(s)   Mohammad Kian Mirdadian

It is certified that error appears in the above-identified patent and that said Letters Patent are hereby corrected as shown below:

Column 11, line 60, "second" should be -- first --;
line 64, after "a", insert -- second --.

Signed and sealed this 24th day of June 1975.

(SEAL)
Attest:

RUTH C. MASON
Attesting Officer

C. MARSHALL DANN
Commissioner of Patents
and Trademarks